US011964295B2

(12) United States Patent
Bamford

(10) Patent No.: US 11,964,295 B2
(45) Date of Patent: Apr. 23, 2024

(54) GIRTH WELD COATER

(71) Applicant: Automatic Coating Limited, Toronto (CA)

(72) Inventor: Brad Bamford, Toronto (CA)

(73) Assignee: Automatic Coating Limited, Toronto (CA)

( * ) Notice: Subject to any disclaimer, the term of this patent is extended or adjusted under 35 U.S.C. 154(b) by 0 days.

(21) Appl. No.: 17/395,756

(22) Filed: Aug. 6, 2021

(65) Prior Publication Data

US 2021/0362179 A1    Nov. 25, 2021

Related U.S. Application Data

(63) Continuation of application No. 16/551,858, filed on Aug. 27, 2019, now Pat. No. 11,097,303, which is a continuation of application No. 15/897,527, filed on Feb. 15, 2018, now Pat. No. 10,434,536.

(60) Provisional application No. 62/460,236, filed on Feb. 17, 2017.

(51) Int. Cl.
| B05C 1/08 | (2006.01) |
| B05C 1/02 | (2006.01) |
| B29C 48/151 | (2019.01) |
| B05C 1/16 | (2006.01) |
| F16L 58/10 | (2006.01) |

(52) U.S. Cl.
CPC ............ B05C 1/0821 (2013.01); B05C 1/022 (2013.01); B29C 48/151 (2019.02); B05C 1/16 (2013.01); F16L 58/109 (2013.01)

(58) Field of Classification Search
None
See application file for complete search history.

(56) References Cited

U.S. PATENT DOCUMENTS

| 1,796,691 A | 3/1931 | Jansen |
| 2,359,751 A | 10/1944 | Cummings et al. |
| 3,972,449 A | 8/1976 | Smith |
| 3,994,766 A | 11/1976 | Dedels |
| 4,340,010 A | 7/1982 | Hart |
| 4,552,594 A | 11/1985 | Van Voskuilen et al. |
| 4,716,271 A | 12/1987 | Hulsizer et al. |
| 5,071,672 A | 12/1991 | Carlson, Jr. et al. |
| 5,074,323 A | 12/1991 | Chapman |
| 5,186,755 A | 2/1993 | Carlson, Jr. |

(Continued)

FOREIGN PATENT DOCUMENTS

| JP | 2009241264 A | 10/2009 |
| WO | 2012094767 A1 | 7/2012 |
| WO | 2017214724 A1 | 12/2017 |

OTHER PUBLICATIONS

International Search Report issued in corresponding PCT Application No. PCT/CA2012/050027; search completed May 7, 2012.

(Continued)

*Primary Examiner* — Jethro M. Pence
(74) *Attorney, Agent, or Firm* — Laurie Wright; Christopher N. Hunter; Blake, Cassels & Graydon LLP

(57) ABSTRACT

A girth weld coating machine has an application head rotatable about a pipeline. A reservoir of coating material is carried on the application head and progressively dispenses coating material on to the girth weld. The coating material is applied to the pipe surface by a roller to spread and distribute the coating over the surface.

21 Claims, 17 Drawing Sheets

(56) References Cited

U.S. PATENT DOCUMENTS

| | | | |
|---|---|---|---|
| 5,207,833 A | 5/1993 | Hart | |
| 5,238,331 A | 8/1993 | Chapman | |
| 5,199,226 A | 12/1993 | Rose | |
| 5,330,431 A | 7/1994 | Herskowitz | |
| 5,352,292 A | 10/1994 | Thomas | |
| 5,458,683 A | 10/1995 | Taylor | |
| 5,589,019 A | 12/1996 | Beeresel et al. | |
| 5,743,969 A | 4/1998 | Lawler | |
| 6,213,657 B1 | 4/2001 | Kobayashi | |
| 6,626,376 B1 | 9/2003 | Rose | |
| 6,832,406 B1 | 12/2004 | Boos et al. | |
| 6,881,266 B1 | 4/2005 | Daykin et al. | |
| 7,059,945 B2 | 6/2006 | Skinner | |
| 7,140,065 B2 | 11/2006 | Boos et al. | |
| 7,442,256 B2 | 10/2008 | Sela et al. | |
| 8,474,401 B2* | 7/2013 | Leiden | B29C 48/92 |
| | | | 118/410 |
| 8,844,463 B2 | 9/2014 | Bamford | |
| 8,932,681 B2* | 1/2015 | Leiden | B29C 48/02 |
| | | | 427/427.3 |
| 9,186,838 B2* | 11/2015 | Leiden | B29C 48/157 |
| 9,649,670 B2 | 5/2017 | Bamford | |
| 2004/0083957 A1 | 5/2004 | Latvis | |
| 2005/0013941 A1 | 1/2005 | Betteridge | |
| 2007/0277923 A1 | 12/2007 | Wood et al. | |
| 2008/0017568 A1 | 1/2008 | Robert et al. | |
| 2011/0030740 A1* | 2/2011 | Bamford | B08B 3/024 |
| | | | 134/115 G |
| 2011/0248072 A1* | 10/2011 | Leiden | B05D 3/0281 |
| | | | 427/544 |
| 2012/0231168 A1 | 9/2012 | Leiden et al. | |
| 2013/0214034 A1 | 8/2013 | Leiden et al. | |
| 2013/0269812 A1* | 10/2013 | Redmond | B05B 3/1057 |
| | | | 137/899 |
| 2013/0312915 A1 | 11/2013 | Cittadini Bellini | |
| 2014/0154409 A1* | 6/2014 | Bregonzio | F16L 58/1063 |
| | | | 427/178 |
| 2014/0312100 A1 | 10/2014 | Leiden et al. | |
| 2016/0114363 A1 | 4/2016 | Bamford | |
| 2016/0144391 A1* | 5/2016 | Glasberg | B29C 48/151 |
| | | | 118/323 |
| 2016/0236233 A1 | 8/2016 | Bond | |
| 2016/0236401 A1 | 8/2016 | Kaltchev | |
| 2016/0257064 A1 | 9/2016 | Scaini et al. | |
| 2018/0202944 A1* | 7/2018 | Sanchez | G01N 21/954 |
| 2018/0236479 A1* | 8/2018 | Bamford | B05C 1/0821 |
| 2019/0314846 A1* | 10/2019 | Ellis | B05B 13/0436 |

OTHER PUBLICATIONS

International Search Report issued in corresponding PCT Application No. PCT/CA2018/050170; search completed Apr. 12, 2018.

* cited by examiner

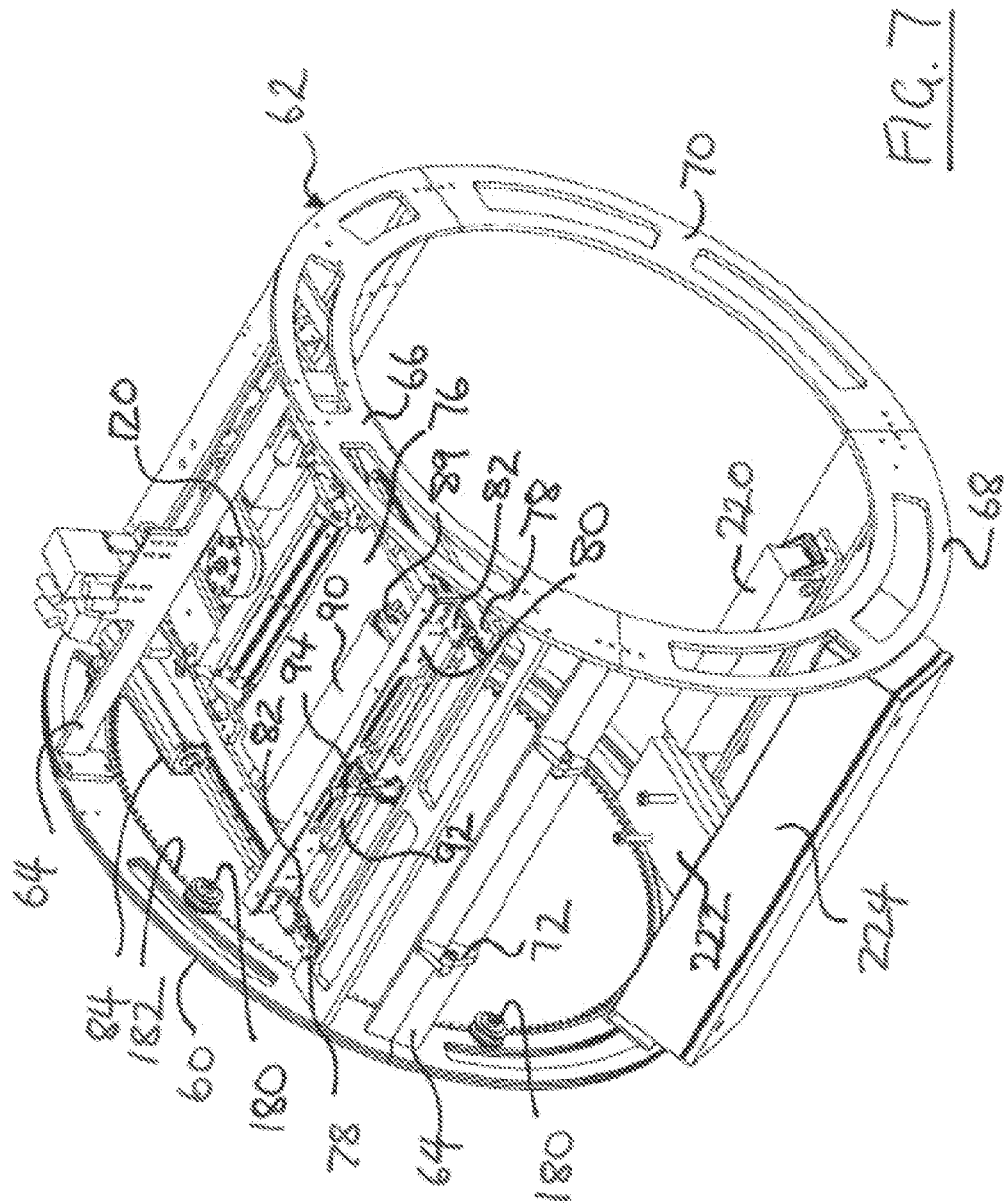

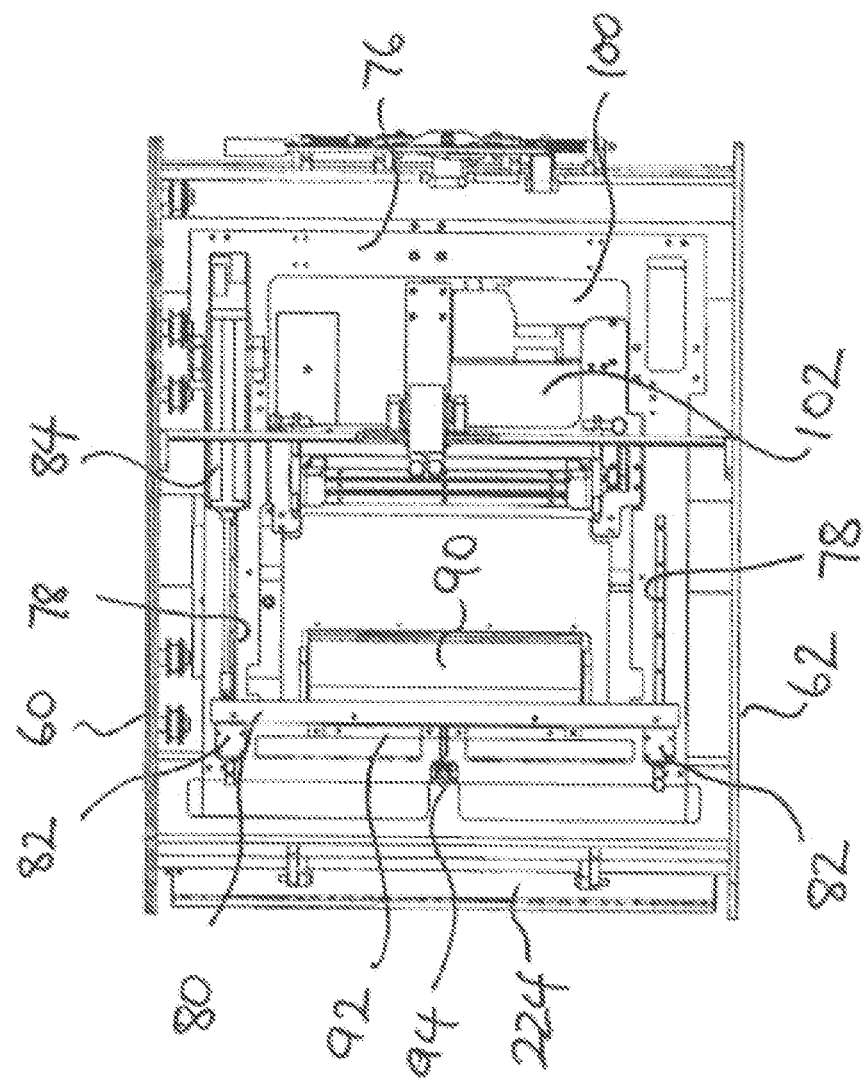

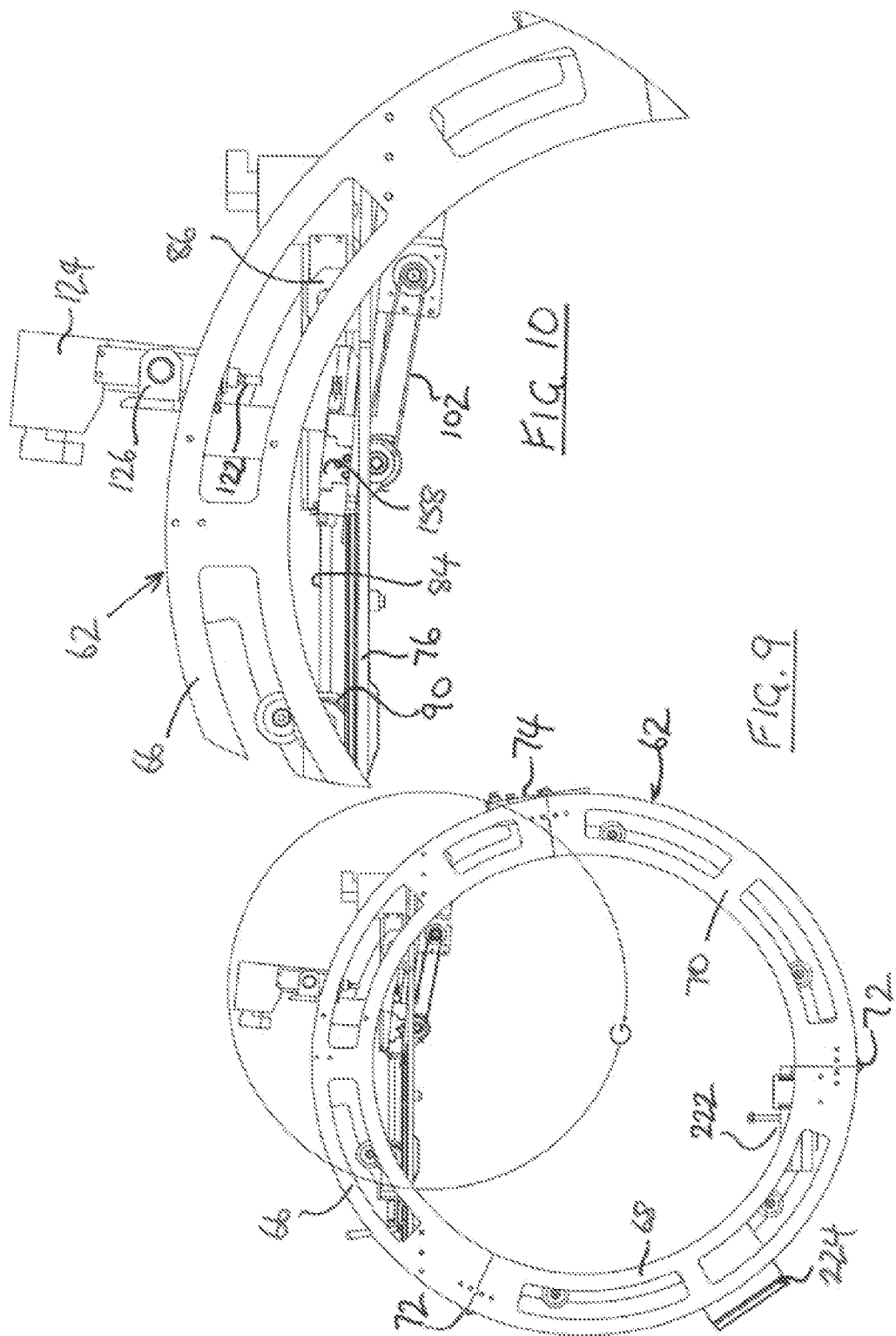

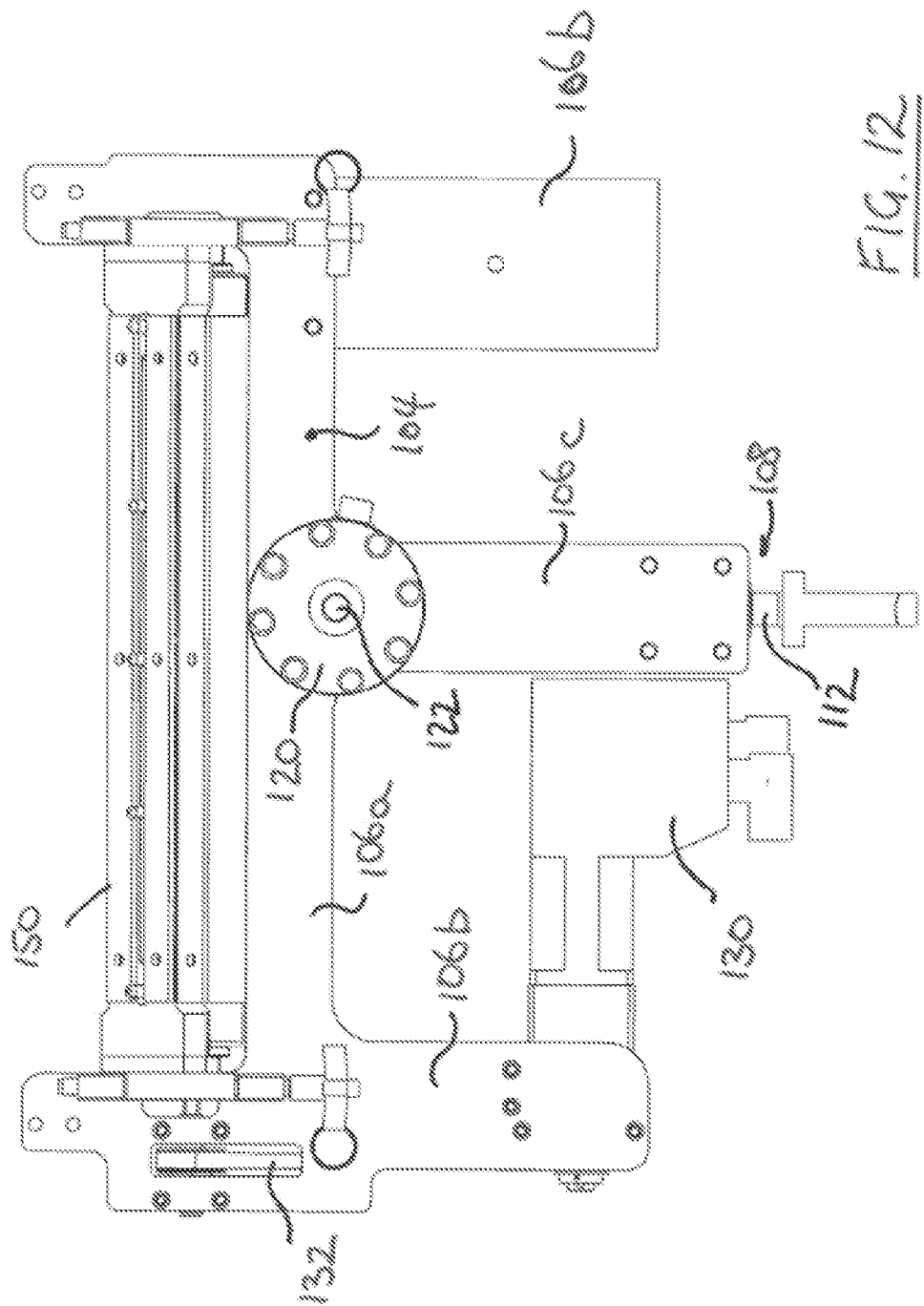

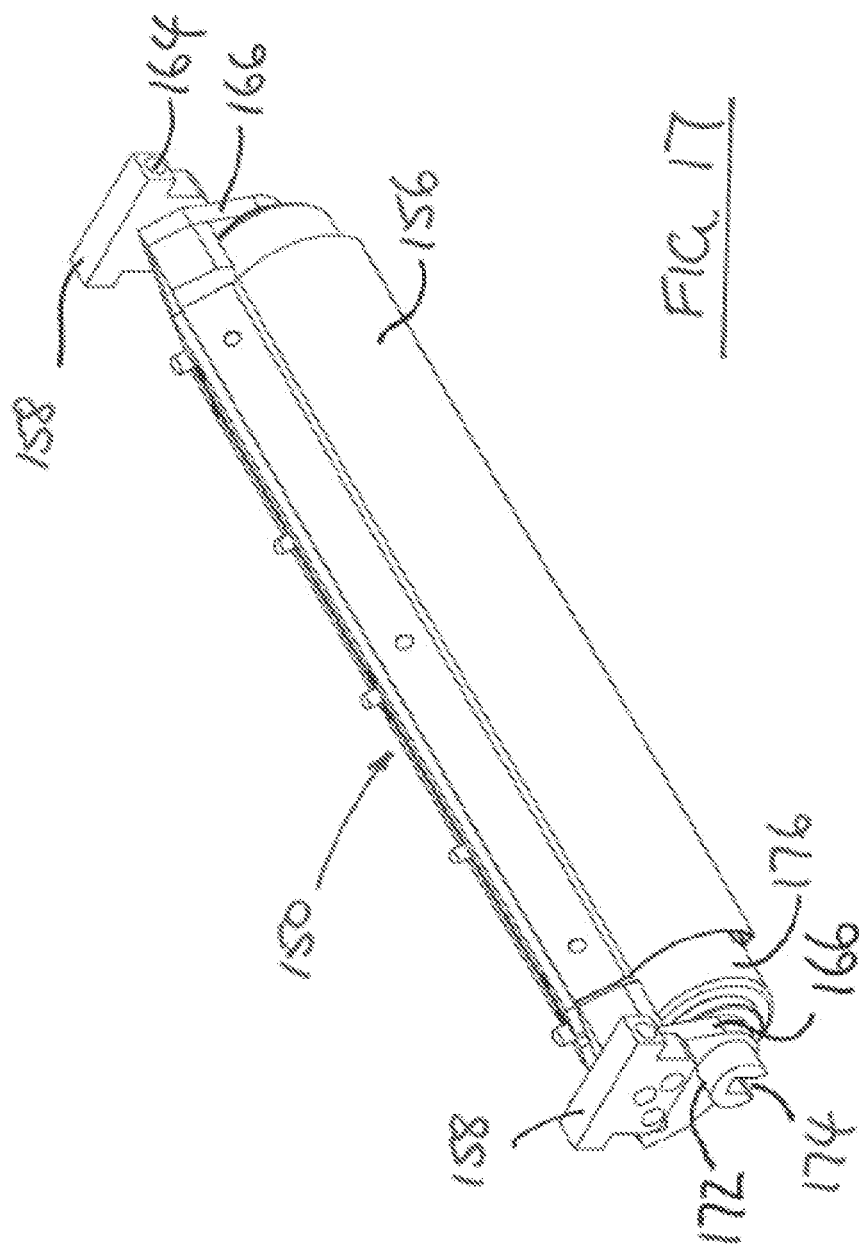

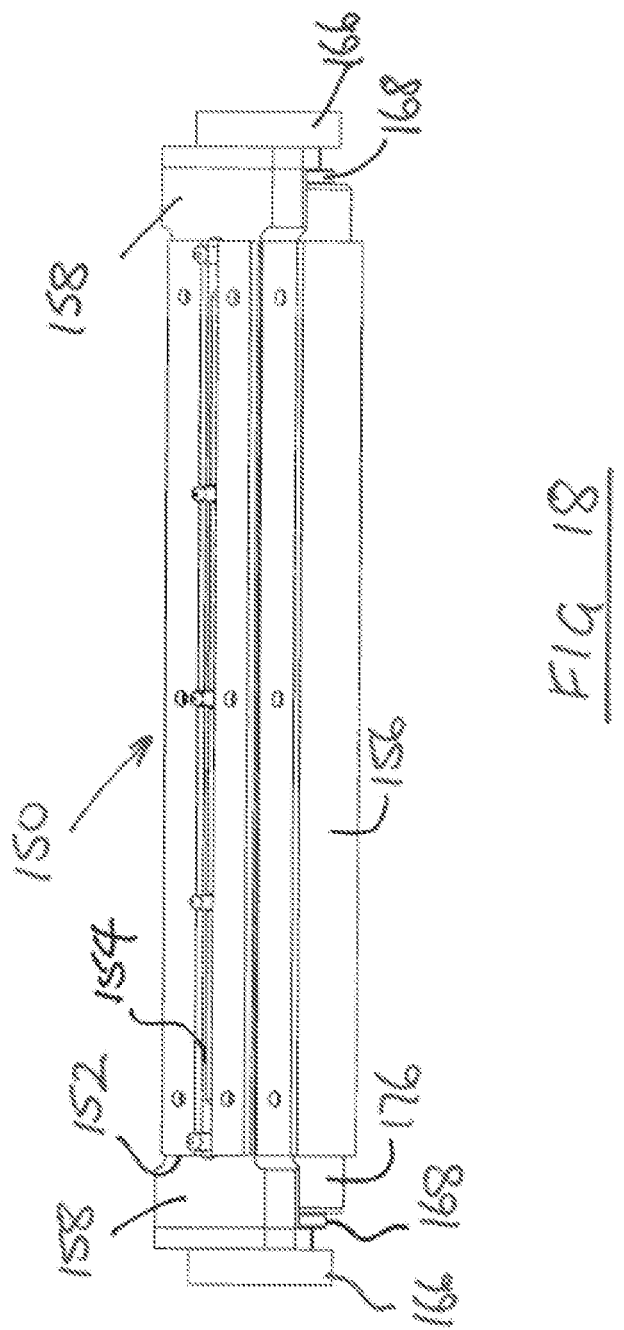

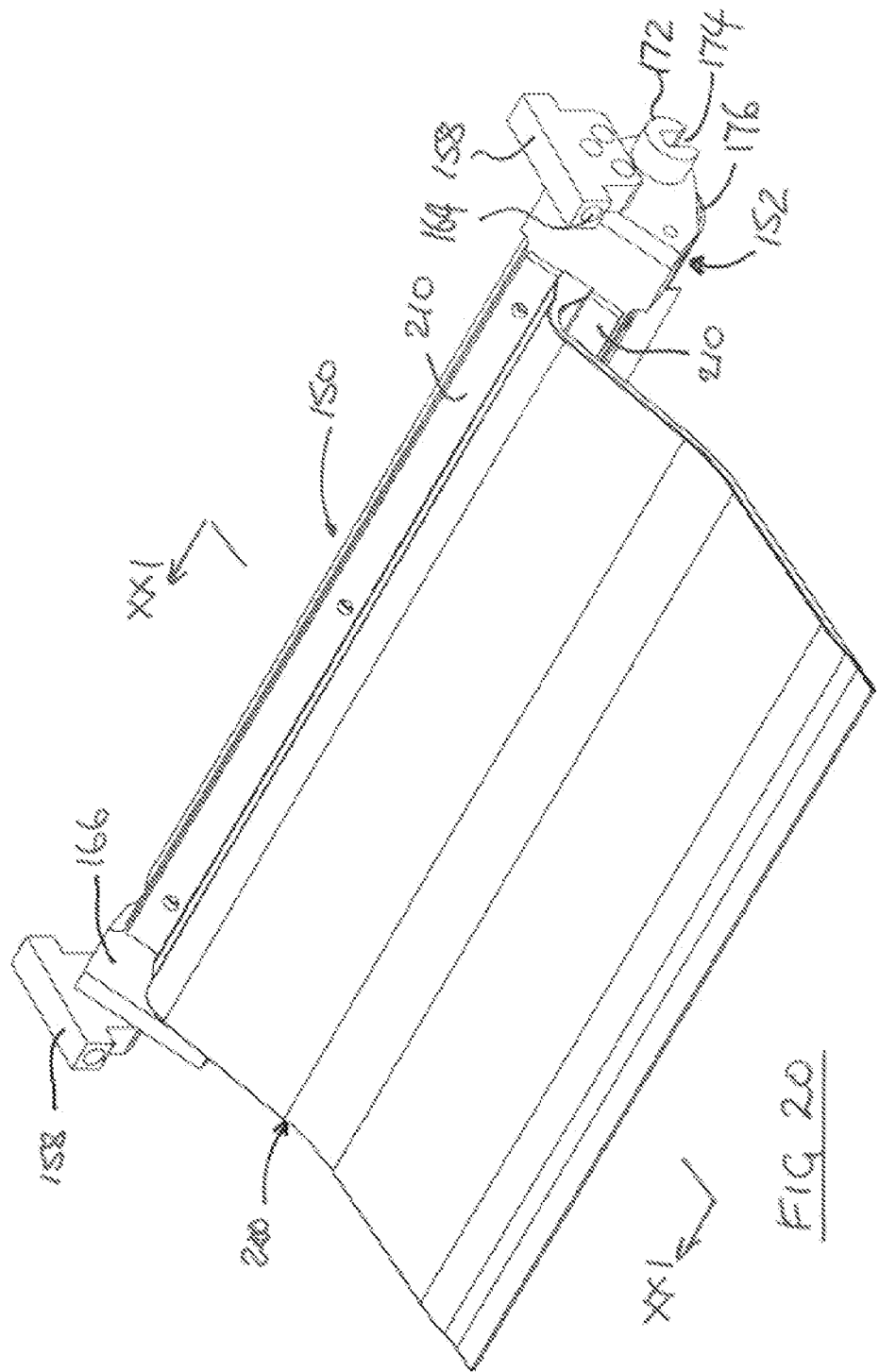

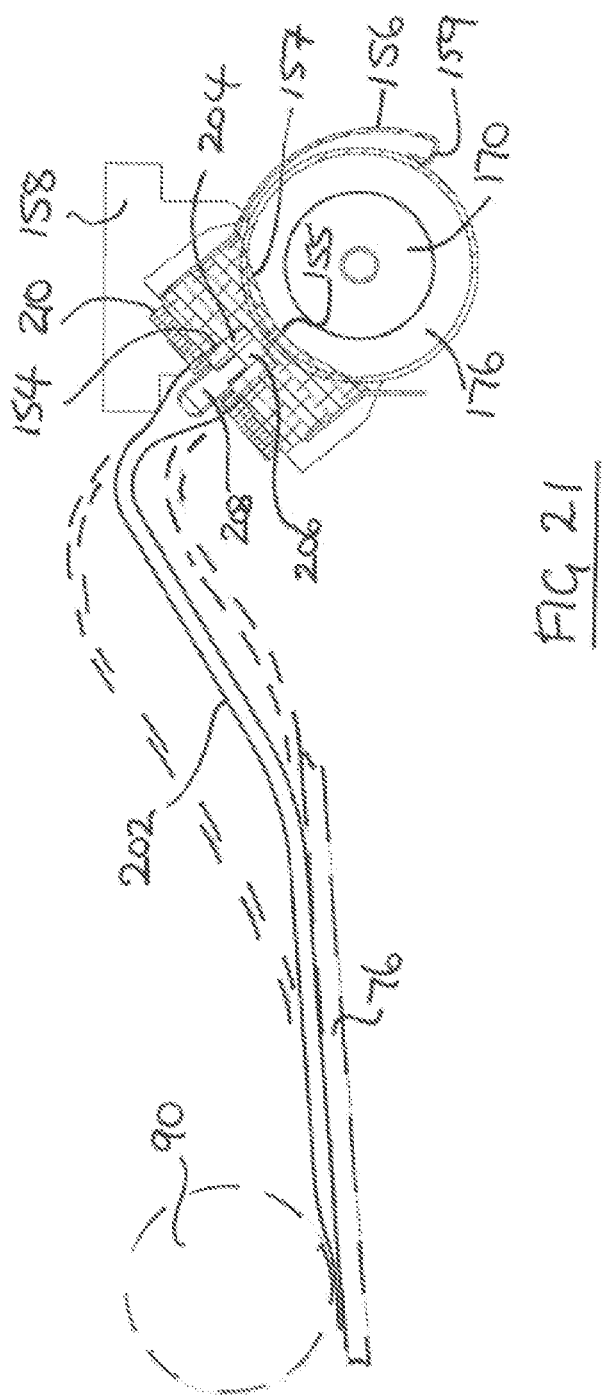

US 11,964,295 B2

GIRTH WELD COATER

CROSS-REFERENCE TO RELATED APPLICATIONS

This application is a continuation of U.S. application Ser. No. 15/897,527 filed on Feb. 15, 2018 and claims priority to U.S. Provisional Patent Application No. 62/460,236 filed on Feb. 17, 2017, the entire contents of which are incorporated herein by reference.

FIELD OF THE INVENTION

The present invention relates to a machine to apply a coating to a girth weld of a pipeline.

DESCRIPTION OF THE PRIOR ART

A pipeline is formed from sections of pipe arranged end to end. The sections are welded to one another about their circumference to provide a continuous fluid tight seal. The weld between adjacent sections is referred to as the girth weld. The exterior surface of sections of pipe is coated during manufacture for corrosion resistance, but the ends of the sections must be left uncoated to allow the girth weld to be performed. Once the weld is formed, it is necessary to coat the exposed ends of each section of pipe to at least the same standard as the rest of the pipe to form a continuous impervious outer coating.

Whilst manual coating of the girth weld is possible, the size and frequency of the girth welds makes this impractical. Moreover, the consistency of manual coating does not meet the quality standards for the coating unless great care is taken.

It is common practice to spray a coating on the girth weld using a two part epoxy coating. The spraying may be performed with a machine used to apply a coating to an entire section of pipe after it has been cleaned of previous coating. Such a machine is shown in FIGS. 1 to 12 of PCT application PCT/CA2012/050027, published as WO2012/094767, the contents of which are incorporated herein by reference.

This machine is intended to progress along a pipe as a spray head oscillates to apply a coating. Whilst this machine is effective in applying a coating on a continuous basis, it is not as satisfactory where intermittent stationary operation is required, such as in coating a girth weld. This is because the coating necessarily has a limited work time and therefore it is necessary to clean the spray head after each application before the machine can be repositioned and set up on the next girth weld. Cleaning requires the use of a solvent, which introduces volatiles in to the environment and therefore is generally undesirable.

WO 2012/094767 also shows in FIGS. 18 to 25 a girth weld coating machine that is mounted on the pipeline over a girth weld. It dispenses a coating on to the girth weld and spreads the coating as the machine rotates. The coating is dispensed from a reservoir provided by a pair of cartridges, one for each component of the coating, and a spreader in the form of a blade spreads the coating over the surface of the pipe sections. The cartridges are sized to contain enough coating for one girth weld and are disposable so they may be removed after each application.

This arrangement has proved satisfactory in applying a coating to the girth welds and avoids the necessity of cleaning the dispensing apparatus with solvents after each application. However, variations in the consistency of the coating and the ambient conditions necessitate careful adjustment of the machine if a coating of the requisite quality is to be obtained.

It is therefore an object of the present invention to obviate or mitigate the above disadvantages.

SUMMARY OF THE INVENTION

In general terms, the present invention provides a girth weld coating machine having an application head rotatable about a pipeline. A reservoir of coating material is carried on the application head and progressively dispenses coating material on to the girth weld. The coating material is applied to the pipe surface by a roller to spread and distribute the coating over the surface.

Preferably, the roller is driven and is interposed between the outlet of the reservoir and the surface of the pipe.

As a further preference, the roller is forced toward the surface of the pipe during distribution of the coating and the force applied is modulated during application.

As a still further preference, the roller is lifted from the surface of the pipe while the roller is driven and continues to rotate.

In a preferred embodiment, the reservoir has a bag to contain the coating with an elongate nozzle arrange parallel to the axis of rotation of the roller. The bag is supported on a platen and coating material is forced from the bag by a roller moving across the platen toward the nozzle.

BRIEF DESCRIPTION OF THE DRAWINGS

An embodiment of the invention will now be described by way of example only with reference to the appended drawings wherein:

FIG. 7 is a rear perspective of the application head of FIG. 6;

FIG. 8 is a plan view of the application head of FIG. 6;

FIG. 9 is an end view of the application head of FIG. 6;

FIG. 10 is an enlarged view of a portion of FIG. 9 with in the chain dotted circle G;

FIG. 12 is a plan view of the sub assembly of FIG. 11;

FIG. 17 is a front perspective of a dispensing unit incorporated in to the applicator subassembly;

FIG. 18 is a front elevation of the dispensing unit of FIG. 17;

FIG. 20 is a perspective view of a dispensing unit incorporating the reservoir of FIG. 19; and FIG. 21 is a section on the line XXI-XXI of FIG. 20.

DETAILED DESCRIPTION OF THE INVENTION

Referring therefore to FIGS. 1 to 4, a pipeline P is formed from pipe sections S1, S2 welded to one another at a girth weld G. A girth weld coating machine 10 is supported on the pipeline P and is used to apply a coating to the weld G, as will be described below.

Figure 1:
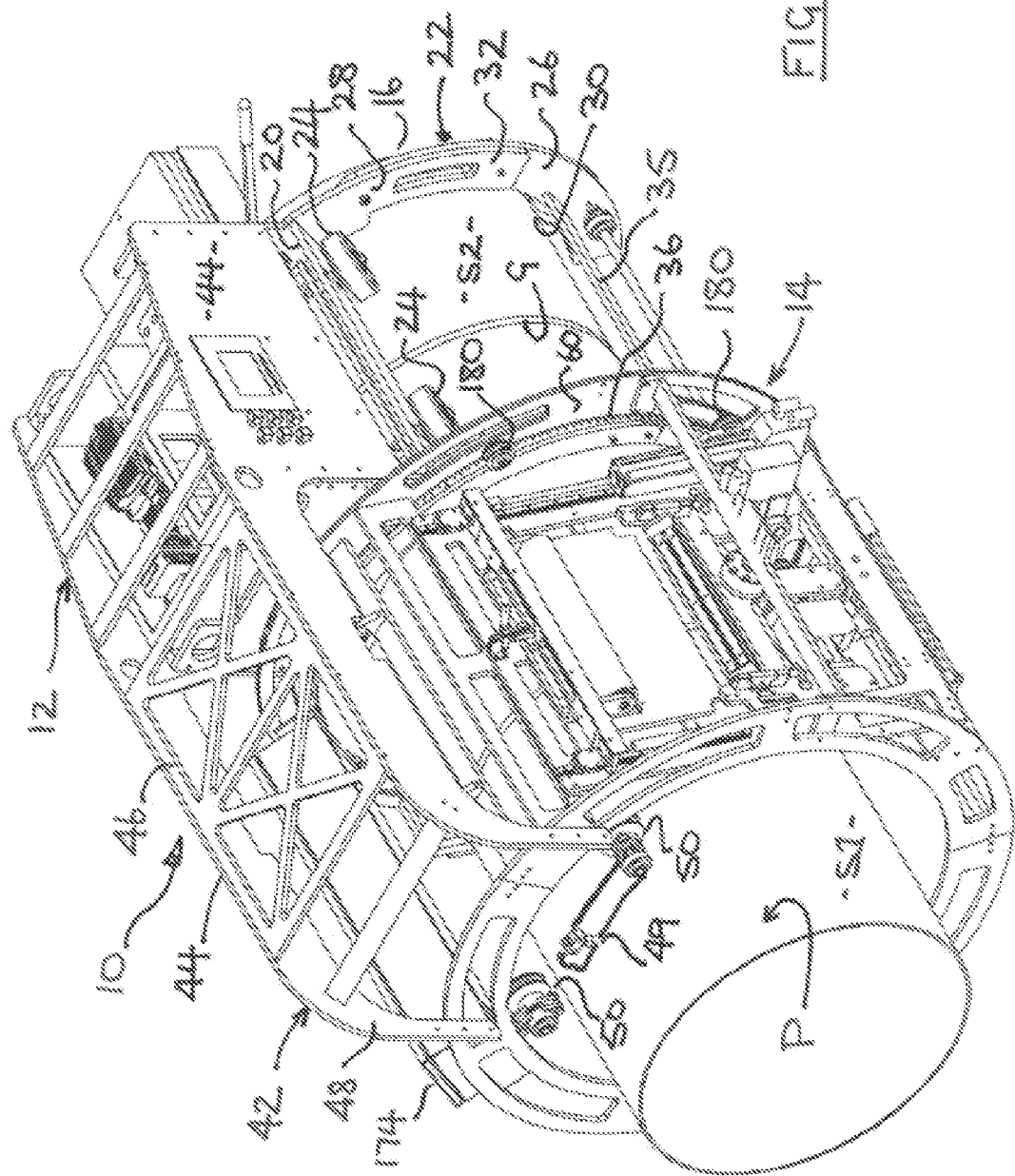
FIG. 1 is a perspective view of a girth weld coating machine.
Figure 2:
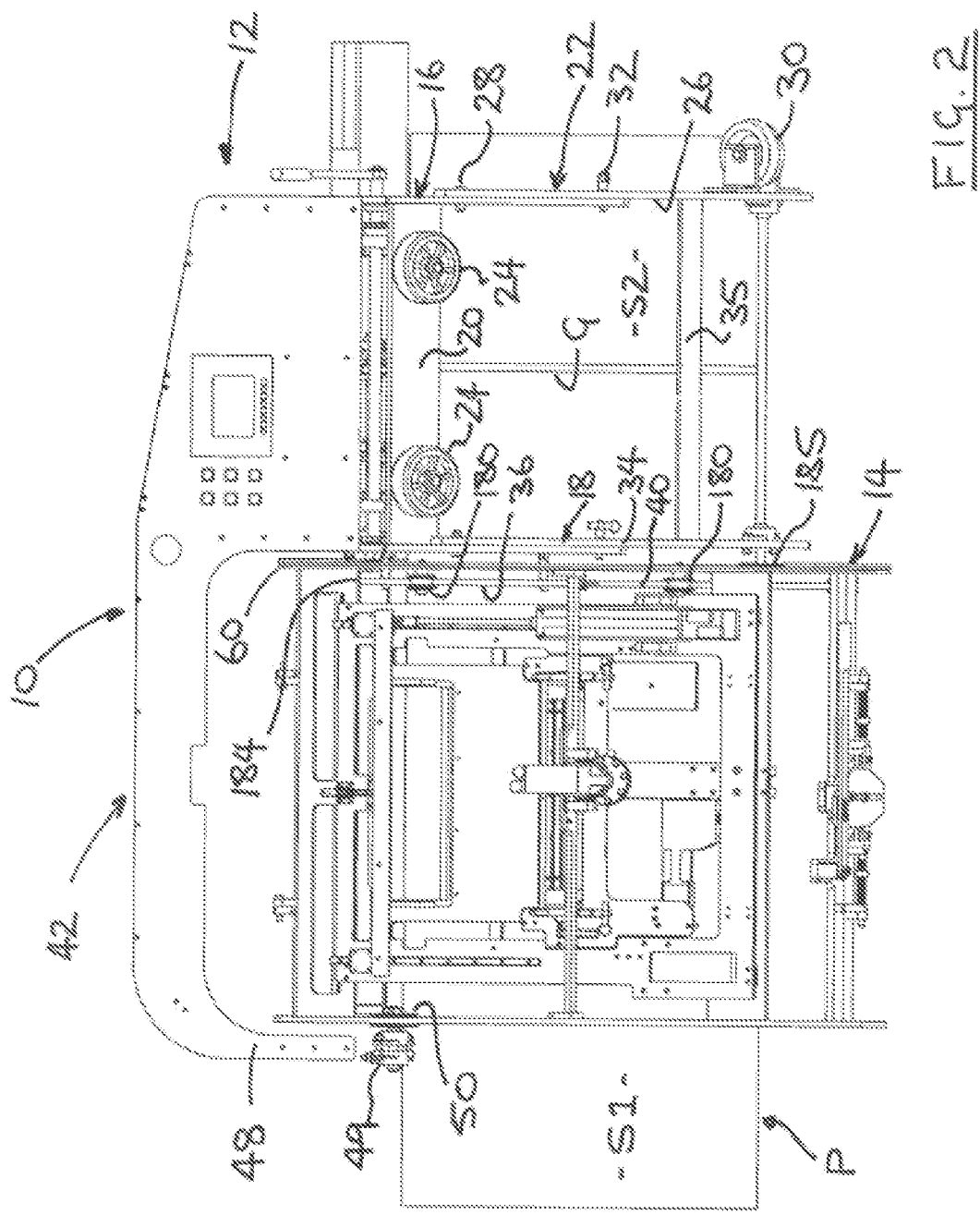
FIG. 2 is a side elevation of FIG. 1.
Figure 3:
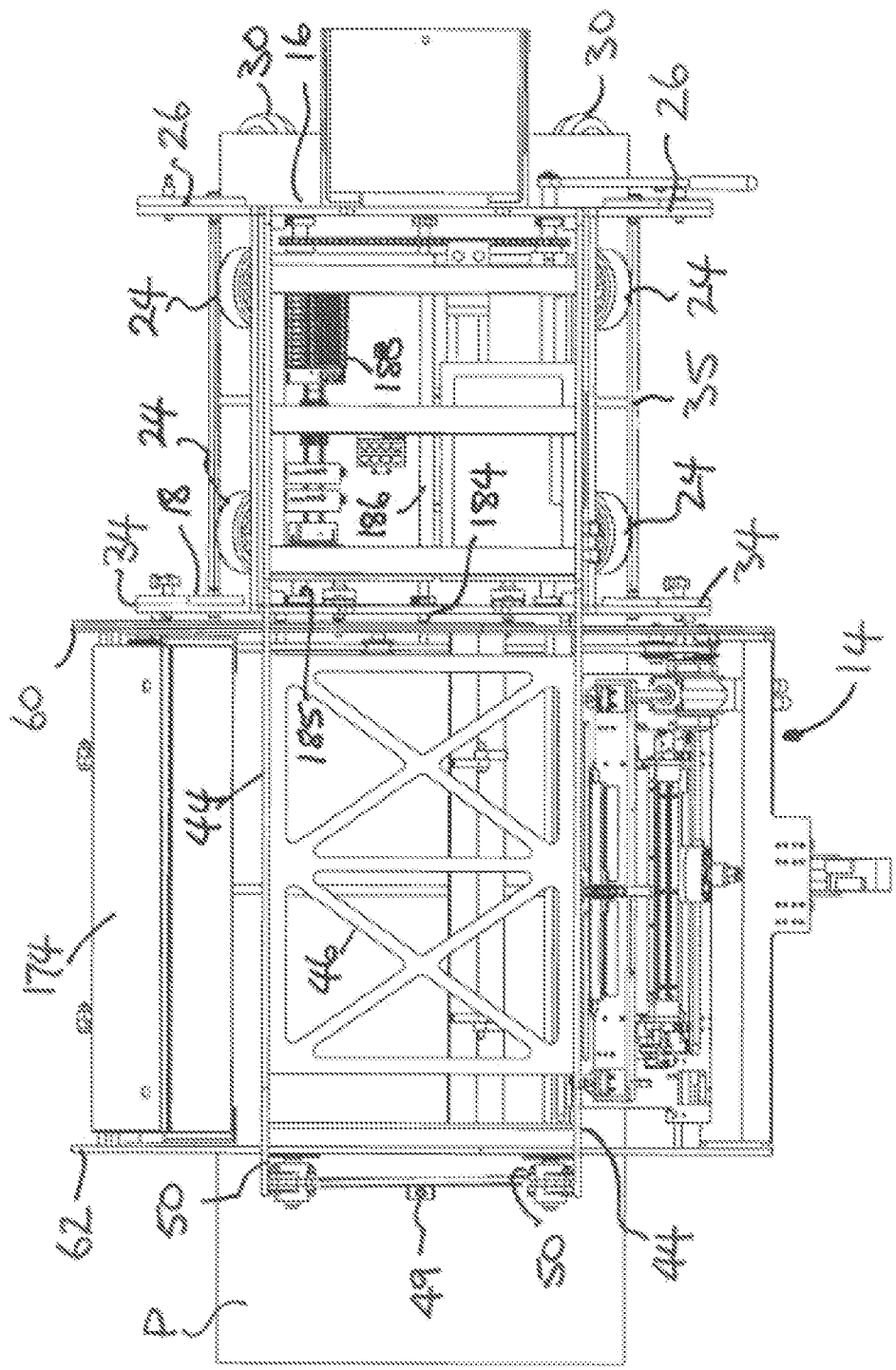
FIG. 3 is a plan view of FIG. 1.
Figure 4:
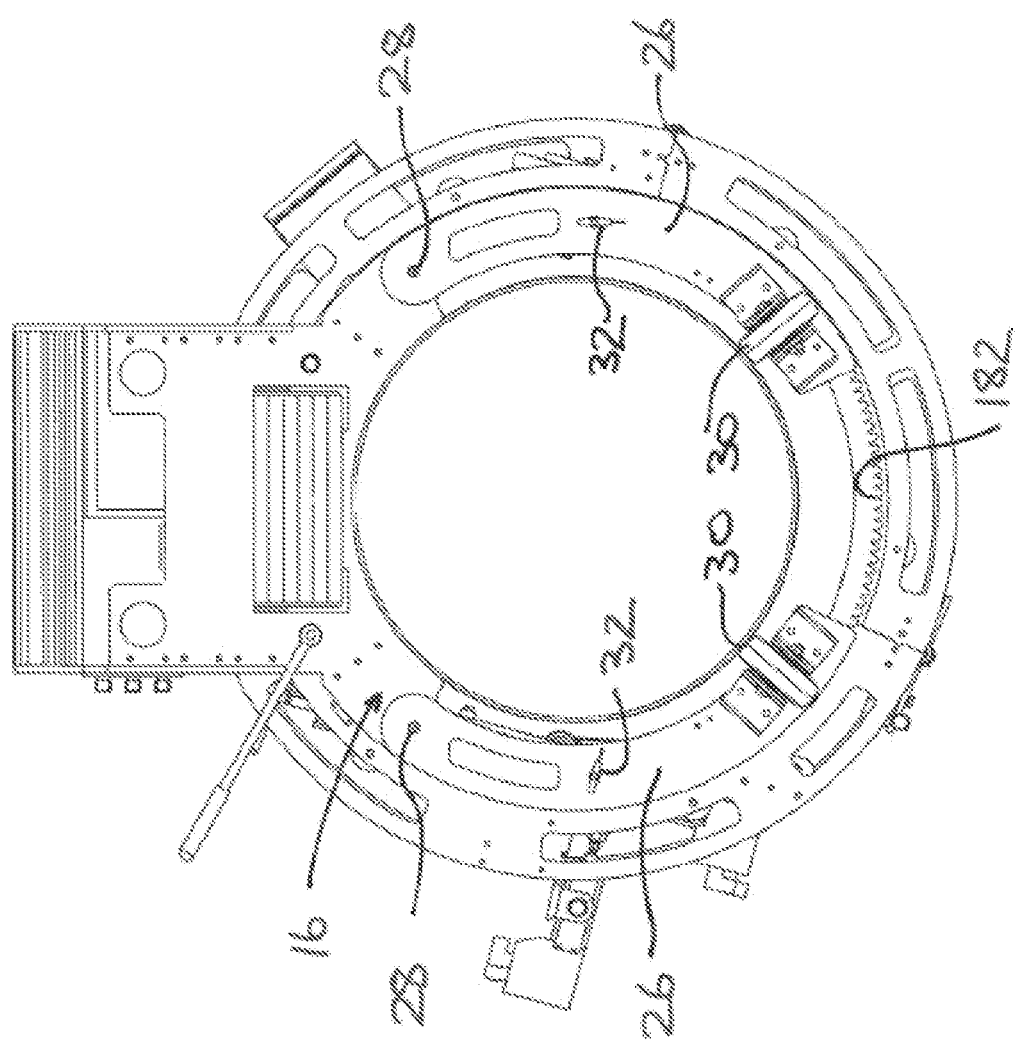
FIG. 4 is an end of the machine of FIG. 1.

The girth weld coating machine 10 includes a support frame 12 that carries an application head 14. As seen in FIGS. 2 and 3, the support frame 12 has a pair of yokes 16, 18, that extend about the pipe P and are connected by stringers 20 to form a unitary cage structure 22 that extends about the pipe P. A pair of wheels 24 are mounted on each of the stringers 20 so as to be spaced along the axis of the pipeline P. The wheels 24 support the cage 22 and allow it to be moved along the pipeline P between locations of the welds G.

The yokes 16, 18 are semi-circular and have an inverted C configuration to allow the cage 22 to be lowered on to the pipeline P. The leading yoke 16 has a pair of arms 26 (FIG. 4) pivotally connected to the yoke 16 by a pin 28. Each arm 26 has a wheel 30 at its lower end and a locking pin 32 secures the arm 26 to the yoke 16 so the wheel 30 engages the underside of the pipeline P.

Figure 5:
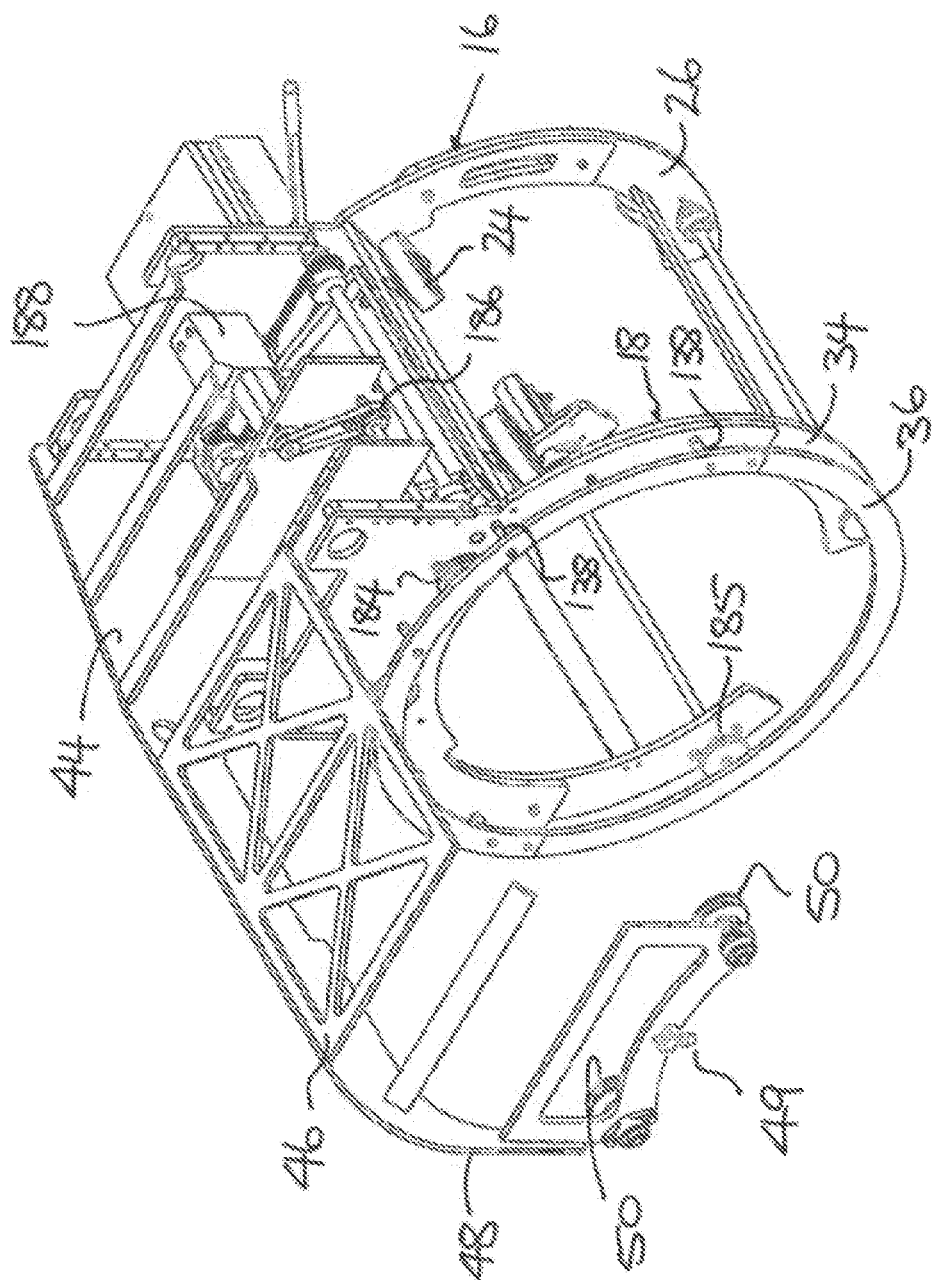
FIG. 5 is a perspective view of a support frame incorporated in to the machine of FIG. 1 with a portion removed for clarity.

The trailing yoke 18 similarly has a pair of arms 34 pivoted to the yoke 18 on opposite sides of the pipeline P and lockable in position by a locking pin 35 (FIG. 3). The arms 26, 34 are connected by stringers 35 for conjoint movement. The yoke 18 and arms 34 carry a segmented support ring 36 that is cantilevered from the yoke 18 and arms 34 by pins 38 (FIG. 5). The ring 36 extends radially outwardly to present a continuous support race 40 for the application head as will be explained more fully below.

A gantry 42 has a pair of side plates 44 that are connected to the yokes 16, 18 and extend rearwardly along the pipe P. Cross members 46 connect the side plates 44 which are relieved to form a bight to accommodate the application head 14. The distal end 48 of the plates 44 extends radially inwardly and carries a foot 49 that is adjustable radially to engage the surface of the pipeline P. A pair of wheels 50 is mounted on the distal end 48 to carry the application head 14, as will be described below.

Figure 6:
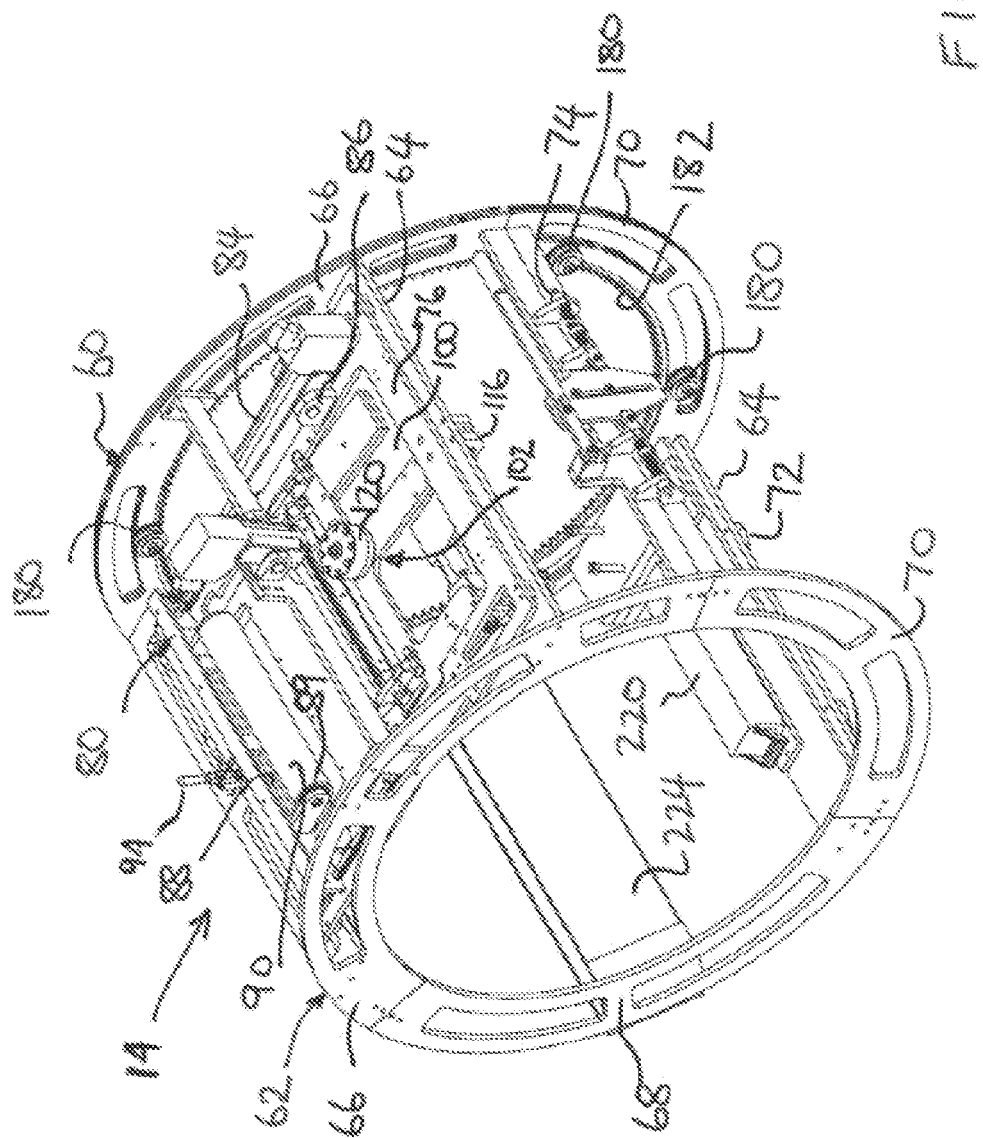
FIG. 6 is a perspective view of an application head used on the machine of FIG. 1.
Figure 11:
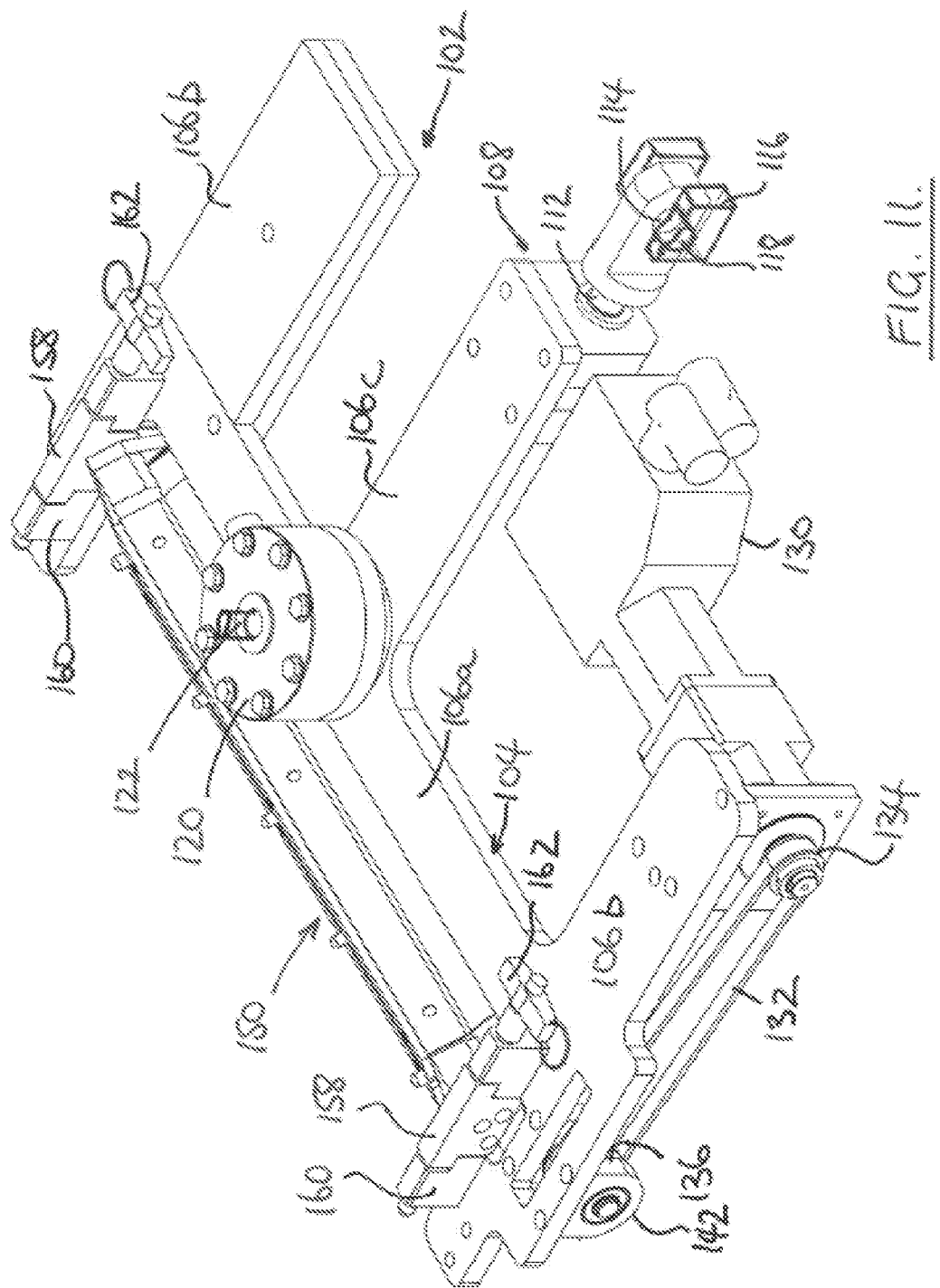
FIG. 11 is a perspective view of an applicator sub assembly used in the application head of FIG. 6.
Figure 16:
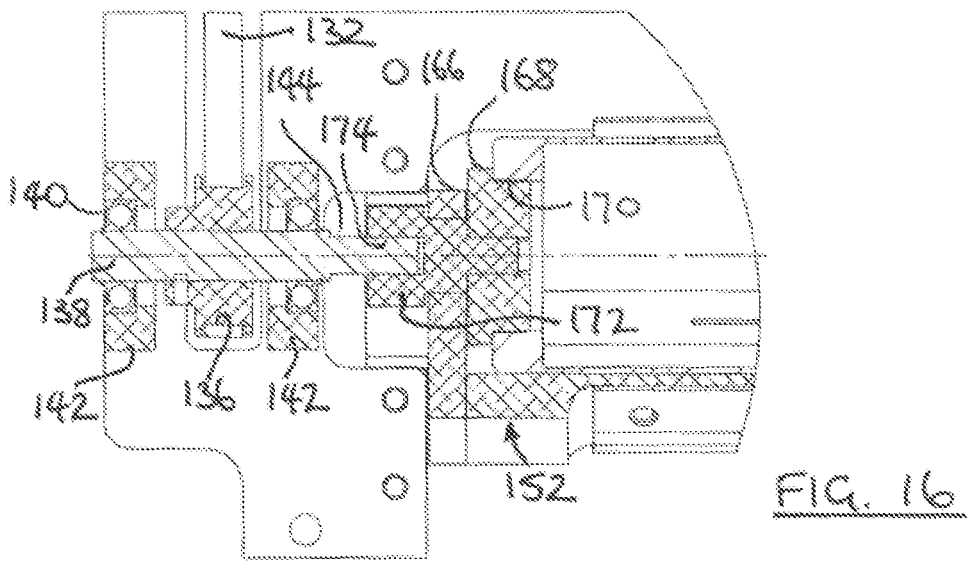
FIG. 16 is an enlarged view of the circled area C of FIG. 15.
Figure 14:
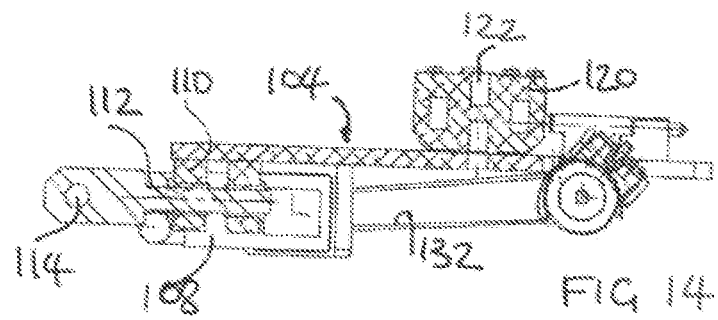
FIG. 14 is a section on the line XIV-XIV of FIG. 12.
Figure 15:
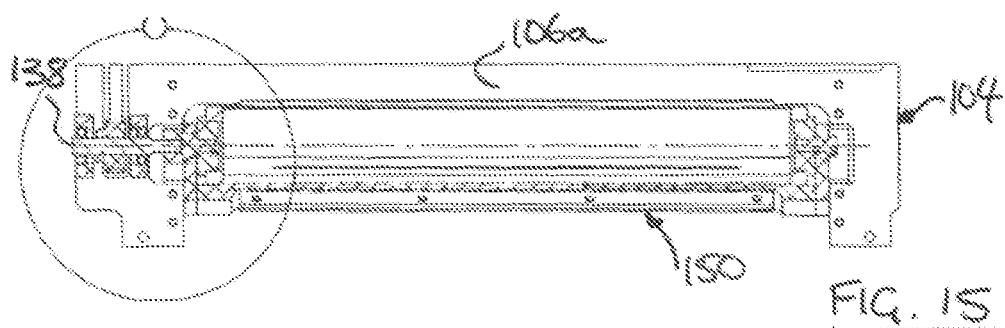
FIG. 15 is a section on the line XV-XV of FIG. 13.
Figure 13:
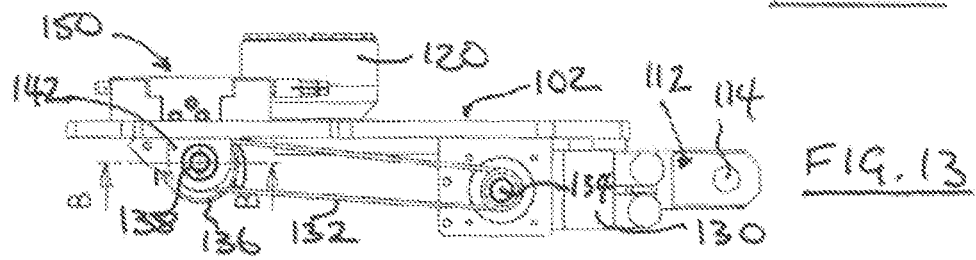
FIG. 13 is an end view of the sub assembly of FIG. 11.

The application head 14, as best seen in FIGS. 6 and 7 has a cylindrical framework 59 provided by a pair of rings 60, 62 that are interconnected by struts 64 to maintain the rings 60, 62 in spaced relationship. Each of the rings 60, 62 is divided in to three segments 66, 68, 70, with the segments 66 and 68 and 68 and 70 connected by hinges 72 (FIG. 7). A latch assembly 74 releasably secures the segment 68 to segment 70 so that the rings 60, 62 can swing open to allow the application head 14 to pass over a pipeline P.

A platform 76 extends between a pair of struts 64 connecting the segments 66. As shown in FIG. 8, a pair of rails 78 is located at opposite sides of the platform 76 to extend parallel to the rings 60, 62. A cross beam 80 is supported on the rails 78 through guide blocks 82 so it can slide along the rails 78 under the control of a linear actuator 84. The actuator 84 is mounted on the trunnions 86 on the platform 76 and is connected to one end of the cross beam 80.

The cross beam 80 carries a U shaped retainer 88 with projecting ears 89. The ears 89 are resilient and carry a dispensing roller 90 that is rotatable about an axis perpendicular to the rails 78. A clamp bar 92 is positioned behind the cross beam 80 and can be moved toward or away from the platform 76 by an over-centre toggle 94.

The platform 76 is formed with an enlarged opening 100 at the opposite end to the roller 90 to accommodate a nozzle sub assembly 102, best seen in FIGS. 9 to 14. The nozzle sub assembly 102 has a generally E-shaped frame member 104 with a central bar 106a extending between a pair of side bars 106b, and an intermediate bar 106 c. A universal joint 108 is secured to the intermediate bar 106c to allow movement about a pair of orthogonal axes and has a trunnion block 110 supporting a rod 112 for rotation about an axis parallel to the rails 78. The rod 112 has a transverse bore 114 at the opposite end to the trunnion block 110 and is received between a pair of ears 116 located on a strut 64 (FIG. 6). A pin 118 secures the rod 112 to the ears 116 to permit movement about an axis perpendicular to the rails 78.

A load cell 120 is mounted on the frame member 104 at the intersection of the central bar 106a and intermediate bar 106c and has a load transfer rod 122 (FIG. 10) extending to an electric linear actuator 124. The actuator 124 is pivotally connected to a clevis 126 on a strut 64 with a control incorporated in to the actuator 124 to regulate movement of the actuator 124.

Referring again to FIGS. 11 to 16, a motor 130 is mounted on the underside of the frame member 104 between the intermediate bar 106c and one of the side bars 106b. The motor 130 drives a toothed drive belt 132 through a pulley 134. The belt 132 extends below one of the side bars 106b and is entrained about a driven pulley 136 mounted on a driven axle 138. The driven axle 138 is rotatably supported in bearings 140 carried on lugs 142 projecting from the underside of the frame member 104 at the intersection of the side bars 106b and the central bar 106a. The driven axle 138 projects inwardly from the lugs 142 and is formed with a square section drive shaft 144.

The drive shaft 144 operatively engages with a dispensing unit 150 that is supported on the frame member 104. Referring to FIGS. 17-21, the dispensing unit 150 has an elongate body 152 with a cavity 154 to receive a nozzle, as will be described below. As best seen in FIG. 21, a slit 155 extends through the base of the cavity 154 and opens in to a part cylindrical cavity defined by a roof 157 that extends to either side of the slit 155 and curved shroud 156 that depends from either side of the body 152. The roof 157 slopes away from the slit 155 and the lower edge 159 of the shroud 156 is turned over to provide a wiping surface. T-shaped mounting blocks 158 are formed at opposite ends of the body 152 and are received in notched supports 160 (FIG. 11) on the upper surface of the sidebars 106b. The blocks 158 are retained by locking pins 162 that pass through aligned bores 164.

Mounting legs 166 depend from the distal ends of the body 152 and carry roller supports 168. The supports 168 are rotatable in the legs 166 and have inwardly directed bosses 170, best seen in FIG. 16. One of the bosses 170 extends through the leg 166 and is formed with a clutch 172. The clutch 172 has an open jaw 174 that is dimensioned to receive the drive shaft 144.

A roller 176 is located on the bosses 170 within the cavity 157. The roller 176 is a conventional paint type roller with a hollow core that is a friction fit on the bosses 170. The roller 176 has an outer application surface that is selected to be compatible with the coating material to be applied. Typically, the roller 176 has a foam body, but different materials may be used. The roof 157 is located closer to the axis of rotation of the bosses 170 than the free body dimension of the roller 176 so that the roller is compressed by the roof when it is mounted on the bosses. In a typical application with a foam roller, the roller outside diameter is 2⅜ inch. so the radius of the sponge roller is 1.1875 inch, and the radius of the extrusion housing is 1.030 inch. The compression between extrusion housing and sponge roller is: 1.1875−1.030=0.157 inch interference which provides a compression of between 40% and 45% of the free body dimension. This has proved satisfactory for a typical coating, although this may vary if different materials are used for the roller and coating.

Figure 19:
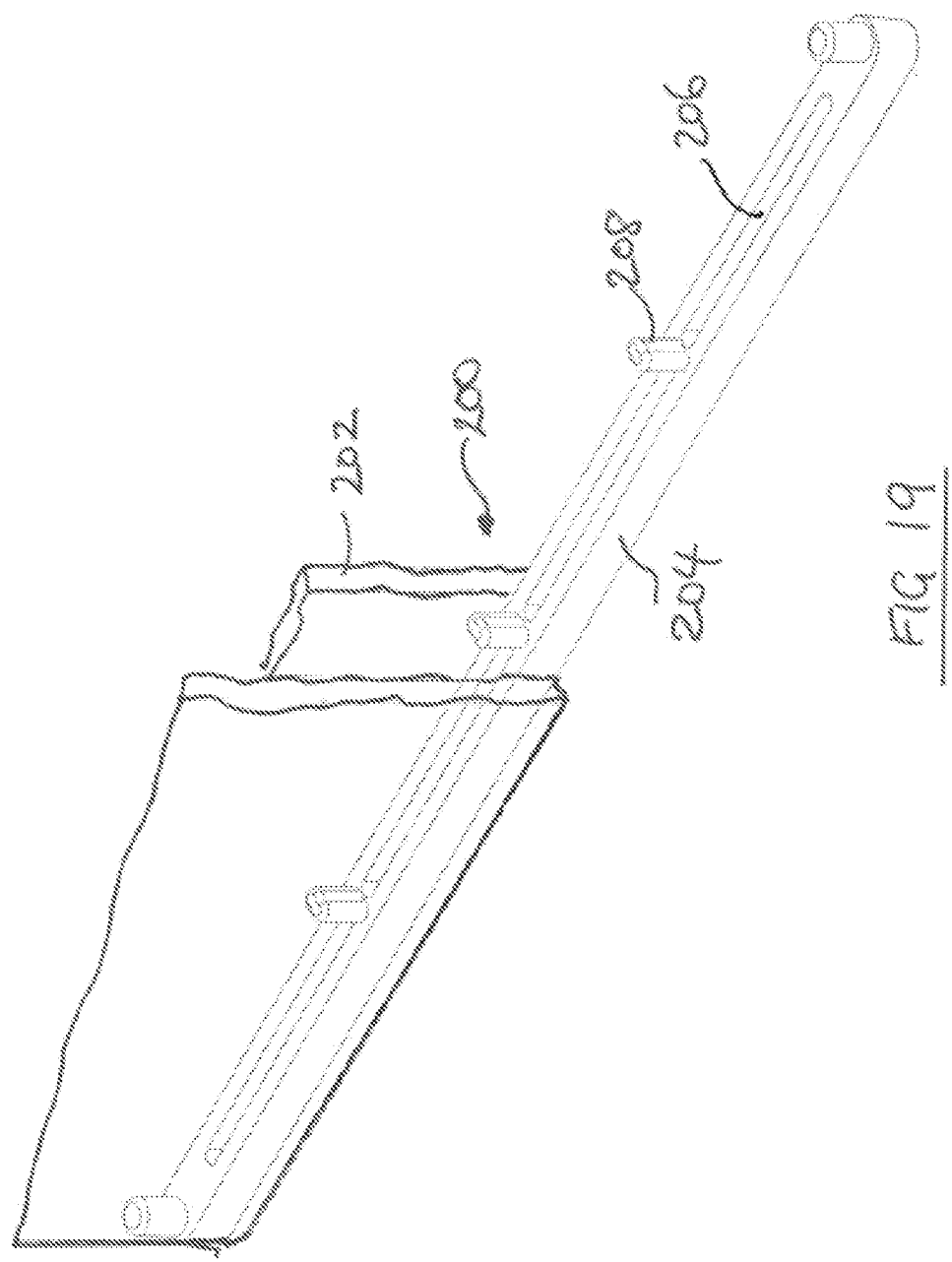
FIG. 19 is a perspective view of a reservoir used in the dispensing unit of FIG. 17.

The material to be applied to the pipe P is held in a reservoir 200 shown in FIG. 19. The reservoir 200 has a flexible plastic pouch 202 which is open at one end. The opposite end of the pouch 202 is stretched around a nozzle 204 which is held in place by tension in the material of the pouch 202. If required, the nozzle 204 may be secured to the opposite end of the pouch 202 by adhesive, welding or integrally molding the pouch and nozzle, but it has been found that the friction fit is usually sufficient. The nozzle 204 is of complimentary shape to the cavity 154 formed in the holder 150 and has a continuous elongate slot 206 to allow the coating material to be dispensed through the slit 155 in the body 150. Bridges 208 are disposed along the slot to maintain the spacing and project upwardly from the nozzle 204 to maintain spacing of the walls of the pouch 202. The nozzle 204 is tapered in cross section so as to be a snug fit within the cavity 154, where it is held by keeper plates 210.

Referring again to FIGS. 6 and 7, power for the actuators 84, 124 and motor 130 is provided from a rechargeable power pack 220 carried on one of the struts 64 that extends between the segments 68. A counterweight 222 is also mounted on the strut 64 to offset the mass of the platform 76 and nozzle sub assembly 102. A control box 224 is mounted on the application head 14 to contain the controllers for the actuators 84, 124 and motor 130.

As shown in FIGS. 1 to 4, the application head 14 is rotatably supported on the gantry 42 within the bight provided by the side plates 44 by rings 60, 62. The inner edge of ring 62 is supported by the wheels 50 carried on the distal end 48 of the side plates 44.

The ring 60 has a series of wheels 180 uniformly spaced about the circumference. The wheels 180 are supported on the race 40 of the ring 36 so that the application head 14 is free to rotate about the axis of the pipe P on the wheels 50, 180.

The radially inner edge of the ring 60 is formed with gear teeth 182 that mesh with a drive sprocket 184 (FIGS. 2 and 3). The sprocket 184 is driven by a drive shaft 186 connected to a motor 188 that is located between the side plates 44. A pair of idler sprockets 185 are located on the distal end of arms 34 to locate and stabilise the ring 60. Operation of the motor 188 rotates the drive shaft 186 and causes the application head 14 to rotate relative to the support frame 12 about the pipe P.

In use, the support frame 12 is positioned on the pipe P by opening the rings 60, 62 and the arms 26, 34 so the machine can be lowered on to the pipe P. The rings 60, 62 and arms are closed and the machine moved along the pipe P on the wheels 24 until the application head 14 is centred over the girth weld G. The foot 49 is brought in to engagement with the pipe P to stabilise the gantry 42 with the application head 14 concentric to the pipe P.

As shown in FIG. 20, the dispensing unit 150 is formed as a disposable unit incorporating the reservoir 200, body 152 and roller 176. The reservoir 200 is loaded with pre-mixed coating material through the open end of pouch 202, which is then folded over several times to seal the pouch 202. The body 152 is secured to the frame member 104 by locating the T shaped mounting blocks 158 in to the notched supports 160 where they are secured by the pins 162. As the body 152 is secured, the jaw 174 of clutch 172 is aligned with and engages the drive shaft 144 to establish a drive to the roller 176.

The distended pouch 202 of reservoir 200 is laid on to the platform 76, shown in ghosted lines in FIG. 21. The opposite end of the pouch 202 is held in position by the clamp bar 92 and the roller 90 (also shown in ghosted outline) snapped in to position between the ears 89. At this time, the actuator 124 is retracted so that the nozzle sub assembly 102 is held away from the pipe P.

The motor 188 is operated and the drive is transmitted through the sprocket 184 so that the application head 14 rotates about the pipe P. The control 174 initiates operation of the motor 130 so that the roller 176 is driven in the same direction of rotation as the application head 14 about the pipe P.

Actuator 124 is operated to lower nozzle sub assembly 102 until the roller 176 is in to contact with the pipe P with a radial force determined by the load cell 120. The linear actuator 84 is operated to move the cross beam 80 progressively along the rails 78. The movement of the cross beam 80 causes the roller 90 to displace the coating material from within the reservoir 200 and move it through the nozzle 204 and on to the roller 176. The efflux of material from the slit 155 causes a further localised compression of the roller 176 as it passes beneath the slot 155 so that the coating material is loaded on to the roller. As the roller 176 moves across the surface of the pipe P, it spreads the material to apply a uniform coating to the surface over the girth weld G. During rotation of the head 14, the universal joint 108 accommodates irregularities in the pipe P to maintain consistent contact between the roller 144 and the pipe P.

Load cell 120 monitors the radial force applied through the frame 104 to the roller 176 and modulates the force to maintain a predetermined profile. In practical testing, it has been found that a constant force provides satisfactory results so that as the thickness of the coating increases, the actuator 124 moves the roller 175 radially outward. Alternatively, the force may be progressively decreased as the coating is applied as determined by the number of rotations of the applicator 14, and maintained at a constant value once all the coating material has been dispensed. However, a constant force that accommodates the increasing thickness of the coating whilst ensuring uniform application of the coating has been found satisfactory for most applications.

Rotation of the application head 14 continues until all the coating material is displaced from the reservoir 200. The linear actuators 84 are disabled once the roller 90 has reached the limit of its travel, indicating all the material is dispensed. Once the coating material is dispensed, the applicator head 14 may continue for several rotations after the material is dispensed to ensure a uniform coating. At that time, the actuator 124 lifts the roller 176 away from the surface of the pipe P with the motor 130 continuing to rotate the roller 176 as it is lifted to maintain a smooth surface.

With the coating applied, drive to the applicator head 14 and roller 176 is terminated and the foot 49 is retracted. The machine 10 may then be moved along the pipe to the next location. The spent dispensing unit 150 including the reservoir 200 is removed from the frame member 104 for disposal by releasing the pins 162 and lifting the mounting blocks 158 and releasing the clamp bar 92. A new dispensing unit 150 including roller 176 and a reservoir 200 may then be deployed and the subsequent girth weld coated. The components that come in to contact with the coating may therefore be disposed of after each weld is coated, thereby avoiding the need for continuous operation or clean up between coating operations.

The provision of the disposable reservoir 200 allows coating material to be premixed under controlled conditions and for a measured volume to be dispensed to ensure a proper application. The coating material may be varied to suit particular applications without the need to clean the machine components with solvents and the like. The control of the radial force by the load cell also allows the quality of the coating to be maintained and the load profile adjusted as different conditions are met.

It will be seen therefor that the girth weld coating machine is able to apply a coating material in a controlled and uniform manner and by using disposable reservoir and roller, the use of solvents between applications is mitigated.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A coating machine to apply a fluid coating to an exterior surface of a tubular structure, said coating machine comprising a support structure to mount said tubular coating machine to said structure and an application head encompassing said tubular structure to apply a coating material to the exterior surface of said tubular structure, said application head including a platform spaced from said exterior surface and moveable about the circumference of said tubular structure, said platform having an outwardly directed support surface, and a dispensing unit carried by said platform and operable to dispense a coating material on to said exterior surface, said dispensing unit including a flexible bag to contain a coating material and supported on said support surface of said platform, a nozzle at one end of said bag, a dispensing roller is moveable across said platform to engage an exterior surface of said bag supported on said support surface and expel coating material from said bag, and an application roller to receive coating material from said nozzle and apply it to said exterior surface.

2. The coating machine of claim 1 wherein a nozzle subassembly is connected to said platform and said application roller is secured to said nozzle subassembly.

3. The machine of claim 2 wherein said nozzle subassembly is pivotally connected to said platform and said bag is supported on said platform with said nozzle and application roller supported by said nozzle subassembly.

4. The coating machine of claim 1 wherein a pair of dispensing actuators are located on opposite sides of said platform to move said dispensing roller across said support surface to traverse said bag.

5. The coating machine of claim 3 wherein said nozzle subassembly is pivotally connected to said platform for movement about a pair of orthogonal axes to permit movement of said nozzle subassembly toward and away from said exterior surface and to permit inclination of said nozzle subassembly relative to said platform.

6. The coating machine of claim 5 wherein movement of said nozzle subassembly toward and away from said exterior surface is controlled by a positioning actuator.

7. The coating machine of claim 6 wherein said positioning actuator is operable to modulate a load applied to said application roller against said exterior surface.

8. The coating machine of claim 2 wherein said application roller is driven by a motor as coating material is dispensed by said dispensing unit.

9. The coating machine of claim 8 wherein said motor is mounted on said nozzle subassembly to drive said application roller.

10. The coating machine of claim 9 wherein said dispensing unit including said application roller and said bag is separable from said application head and a clutch connects said application roller to said motor.

11. The coating machine of claim 1 wherein a shroud extends partially about said application roller.

12. The coating machine of claim 11 wherein said shroud compresses said application roller.

13. The coating machine of claim 1 wherein said application roller is rotatably mounted in a body and said bag is secured to said body.

14. The coating machine of claim 13 wherein said nozzle is located on said body.

15. The coating machine of claim 14 wherein said nozzle is elongate and extends along the axis of rotation of said application roller.

16. The coating machine of claim 15 wherein a shroud extends partially about the application roller.

17. The coating machine of claim 15 wherein said application roller is compressible and said shroud compresses said roller as it rotates through the shroud.

18. The coating machine of claim 16 wherein said shroud has a wiping surface along one edge.

19. The coating machine of claim 16 wherein said application roller is located in said body on roller supports that rotate relative to the body.

20. The coating machine of claim 19 wherein one of said roller supports has a clutch member extending from said body for engagement with a drive member.

21. The coating machine of claim 19 wherein a pair of mounting blocks are located at opposite ends of said body to secure said body to a frame member.

\* \* \* \* \*